United States Patent [19]

Gaylord

[11] 3,864,319

[45] Feb. 4, 1975

[54] METHOD FOR PREPARING ALTERNATING COPOLYMERS USING A FRIEDEL-CRAFTS CATALYST AND A FREE RADICAL INITIATOR IN AN AQUEOUS MEDIUM

[75] Inventor: Norman G. Gaylord, New Providence, N.J.

[73] Assignee: Gaylord Research Institute, Inc., Newark, N.J.

[22] Filed: Nov. 1, 1972

[21] Appl. No.: 302,964

Related U.S. Application Data

[63] Continuation-in-part of Ser. No. 66,887, Aug. 25, 1970, abandoned.

[52] U.S. Cl.............. 260/82.3, 260/82.5, 260/83.5, 260/85.5, l260/86.7
[51] Int. Cl. ....... C08d 1/09, C08d 1/18, C08d 1/22
[58] Field of Search................ 260/83.5, 82.5, 82.3

[56] References Cited
UNITED STATES PATENTS

| | | | |
|---|---|---|---|
| 3,637,611 | 1/1972 | Takeya et al. | 260/78.5 N |
| 3,647,753 | 3/1972 | Nakaguchi et al. | 260/63 R |
| 3,700,637 | 10/1972 | Finch | 260/83.3 |

*Primary Examiner*—William F. Hamrock
*Attorney, Agent, or Firm*—Lawrence Rosen; E. Janet Berry

[57] ABSTRACT

An improved method for preparing 1:1 alternating copolymers by reacting an electron donor monomer and an electron acceptor monomer in an aqueous medium in the presence of a Friedel-Crafts halide and a water-soluble free radical initiator.

9 Claims, No Drawings

METHOD FOR PREPARING ALTERNATING COPOLYMERS USING A FRIEDEL-CRAFTS CATALYST AND A FREE RADICAL INITIATOR IN AN AQUEOUS MEDIUM

This application is a continuation-in-part of Ser. No. 66,887, filed Aug. 25, 1970, now abandoned.

The present invention relates to a novel method for the preparation of alternating copolymers by the copolymerization of electron donor monomers with electron acceptor monomers. More specifically, the invention pertains to the preparation of high molecular weight equimolar alternating copolymers from non-polar monoolefins or multiolefins and polar electron acceptor monomers in an aqueous medium.

The copolymerization of a monomer containing strongly electron donating substituents with a monomer containing strongly electron withdrawing substituents yields an essentially alternating copolymer, that is, a copolymer in which the comonomer units are present in essentially equimolar quantities and are situated alternately along the copolymer chain. Alternating copolymers are also produced by the copolymerization of an electron donating monomer with an electron acceptor which does not readily undergo homopolymerization. Thus, alternating copolymers are produced, for example, from the copolymerization of the electron donor monomers, styrene and butadiene with the electron acceptors, vinylidene cyanide, maleic anhydride and sulfur dioxide.

The complexation of a moderately or weakly electron accepting monomer containing pendant carbonyl, carboxylate, carboxamide or nitrile groups with a Friedel-Crafts catalyst, Lewis acid or organo-aluminum halide increases the electron accepting characteristics of the monomer, and on copolymerization with an electron donor monomer, yields alternating copolymers. Thus, complexation of methyl acrylate, methyl methacrylate or acrylonitrile with zinc chloride, aluminum chloride, boron trifluoride, ethyl aluminum dichloride or ethyl aluminum sesquichloride permits the formation of alternating copolymers with butadiene, isoprene, styrene, ethylene, propylene and higher alpha-olefins.

The preparation of alternating copolymers from electron donor monomers and electron acceptor monomers as a result of complexation of the electron acceptor monomers may be carried out in the absence as well as in the presence of an organic free radical initiator in bulk, or in an inert hydrocarbon or halogenated hydrocarbon solvent such as benzene, toluene, hexane, carbon tetrachloride, chloroform, etc. (N. G. Gaylord and H. Antropiusova, Journal of Polymer Science, Part B, 7, 145 (1969) and Macromolecules, 2, 442 (1969); A. Takahashi and N. G. Gaylord, Journal of Macromolecular Science (Chemistry), A4, 127 (1970).

A process for the free radical initiated copolymerization of non-polar allylic and olefinic compounds with polar monomers, such as acrylonitrile and methyl methacrylate, in the presence of a Friedel-Crafts halide such as zinc chloride, under anhydrous conditions, is described in U.S. Pat. No. 3,183,217. The copolymerization is carried out in bulk or in an inert organic solvent.

An improved process by the same inventors, described in U.S. Pat. No. 3,278,503, extends the process to the copolymerization of $C_5$–$C_{12}$ diolefins under anhydrous conditions and discloses that excess polar monomer is the preferred diluent for both monoolefin and diolefin free radical initiated copolymerization with polar monomers which are complexed with a Friedel-Crafts halide.

The formation of alternating copolymers from the copolymerization of an olefin, halogenated olefin or multiolefin with an acrylic monomer in the presence of an organoaluminumm or organoboron halide and, if necessary, in the presence of oxygen or an organic peroxide, is disclosed in British Pat. No. 1,123,724 and earlier British Patents by the same inventors referred to therein. The copolymerization is carried out in liquid monomer or in inert solvents such as hydrocarbons or halogen-containing hydrocarbons.

The prior art clearly teaches that the copolymerization of non-polar monomers with polar monomers in the presence of a Friedel-Crafts catalyst and, where necessary, oxygen or an organic peroxide, requires anhydrous, preferably non-polar, media.

It has now been discovered that alternating copolymers can be prepared from electron donor monomers and electron acceptor monomers in the presence of a suitable Friedel-Crafts catalyst and a water-soluble free radical initiator in an aqueous medium.

The electron donor monomers are typically acyclic and cyclic monoolefins and conjugated dienes. The monoolefins may be alpha-olefins or internal olefins including cycloolefins and may be unsubstituted or may contain alkyl, aryl or aralkyl substituents. The effective alpha-olefins include 1-alkenes such as ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene and other 1-alkenes containing up to 40 carbon atoms. Other alpha-olefins which are useful in the process of this invention are substituted 1-alkenes having the following structural formula

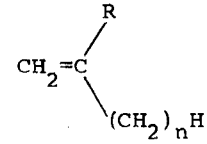

where R is an alkyl moiety containing 1 to 8 carbon atoms and n is an integer from 1-40 and include isobutylene, 2-methyl-1-butene, 2-methyl-1-pentene, 2-methyl-1-hexene, 2-methyl-1-heptene, 2-methyl-1-octene, 2-methyl-1-nonene, 2-ethyl-1-pentene, 2-ethyl-1-hexene, 2-ethyl-1-heptene, 2-propyl-1-hexene, 2-butyl-1-nonene, 2-isopropyl-1-octene and the like. 1-Alkenes having substituents further removed from the double bond are effective and include 3-methyl-1-pentene, 4-methyl-1-pentene, 3-methyl-1-hexene, 5-methyl-1-hexene and the like. Aromatic substituted alpha-olefins are particularly effective electron donor monomers and include styrene, alpha-methylstyrene, p-methylstyrene, o-methylstyrene, m-methylstyrene, p-ethylstyrene, p-propylstyrene, p-isopropylstyrene, p-butylstyrene, p-nonylstyrene, p-chlorostyrene, and other 1-alkenes containing alkyl substituted aromatic moieties. Similarly, alpha-olefins containing aromatic substituents further removed from the double bond such as 3-phenyl-1-butene, 4-p-methylphenyl-1- pentene and the like are effective electron donor monomers.

Internal olefins which are useful electron donor monomers in the present invention may be unsubstituted alkyl or aryl substituted acyclic or cyclic monoolefins including 2-butene, 2-pentene, 2-hexene, 3-hexene, 2-heptene, 3-heptene, 2-octene, 3-octene, 4-octene, 2-nonene, 3-nonene, 4-nonene, 2-methyl-2-butene, 2-methyl-2-pentene, 4-methyl-2-pentene, 2-methyl-2-hexene, 4-methyl-2-hexene, 5-methyl-2-hexene, 2,5-dimethyl-3-hexene, 1-phenyl-3-pentene, cyclopentene, cycloheptene, cyclooctene, cyclononene, cyclodecene, cycloundecene, cyclododecene, 1-methylcycloheptene, 5-methylcycloheptene and the like.

The conjugated dienes which are useful as electron donor monomers in the process of this invention comprise compounds having the following structural formula:

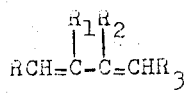

where R, $R_1$, $R_2$ and $R_3$, which may be the same or different, represent a member of the group consisting of hydrogen, aryl, cycloalkyl or alkyl radicals having from 1 to 40 carbon atoms, and preferably from about 1 to 8 carbon atoms. Illustrative conjugated dienes include butadiene, isoprene, 2-chloro-1,3-butadiene, 2,3-dichloro-1,3-butadiene, 2,3-dimethylbutadiene, propylene, 2,4-hexadiene, 2-methyl-1,3-pentadiene, 2-ethyl-1,3-butadiene, 2-propyl-1,3-butadiene, 2-phenyl-1,3-butadiene, 3-methyl-1,3-pentadiene, 2-ethyl-1,3-pentadiene, 2-methyl-1,3-hexadiene and the like. Cyclic conjugated dienes such as 1,3-cyclohexadiene, 1,3-cycloheptadiene, 1,3-cyclooctadiene, 1,3-cyclononadiene, 1,3-cyclodecadiene, 1,3cycloundecadiene, 1,3-cyclododecadiene and the like are also effective electron donor monomers.

The electron acceptor monomers typically contain carbonyl, carboxyl, carboxylate, carboxamide and nitrile groups. Thio analogues of the oxygen-containing functional groups are also effective electron acceptor monomers. Illustrative electron acceptor monomers include acrylic acid, acrylamide, acrylonitrile, alkyl acrylates in which the alkyl moiety contains 1 to 40 carbon atoms, preferably 1 to 22 carbon atoms, including methyl acrylate, ethyl acrylate, propyl acrylate, isopropyl acrylate, butyl acrylate, isobutyl acrylate, sec-butyl acrylate, hexyl acrylate, 2-ethylhexyl acrylate, heptyl acrylate, octyl acrylate, isooctyl acrylate, nonyl acrylate, decyl acrylate, undecyl acrylate, dodecyl acrylate, tridecyl acrylate, pentadecyl acrylate, hexadecyl acrylate, octadecyl acrylate and the like, aryl acrylates such as penyl acrylate and p-tolyl acrylate, cycloalkyl acrylates such as cyclohexyl acrylate, methacrylic acid, methacrylamide, methacrylonitrile, alkyl methacrylates in which the alkyl moiety contains 1–40 carbon atoms, preferably 1 to 22 carbon atoms, including methyl methacrylate, ethyl methacrylate, propyl methacrylate, isopropyl methacrylate, butyl methacrylate, isobutyl methacrylate, sec-butyl methacrylate, amyl methacrylate, hexyl methacrylate, heptyl methacrylate, octyl methacrylate, 2-ethylhexyl methacrylate, nonyl methacrylate, decyl methacrylate, undecyl methacrylate, dodecyl methacrylate, tridecyl methacrylate, pentadecyl methacrylate, hexadecyl methacrylate, octadecyl methacrylate, and the like, aralkyl methacrylates such as benzyl methacrylate, aryl methacrylates such as phenyl methacrylate and p-tolyl methacrylate and cycloalkyl methacrylates such as cyclohexyl methacrylate as well as methyl vinyl ketone, ethyl vinyl ketone, methyl isopropenyl ketone, acrolein, methacrolein and the like. The sulfur containing compounds which are effective electron acceptor monomers include thiocarboxylic acids such as thioacrylic acid and thiomethacrylic acid, thiocarboxamides such as thioacrylamide and thiomethacrylamide as well as alkyl, aryl, aralkyl and cycloalkyl thiocarboxylates such as methyl thioacrylate, methyl thiomethacrylate, phenyl thioacrylate, benzyl thiomethacrylate, cyclohexyl thiomethacrylate and the like. Dithioacrylic acid, dithiomethacrylic acid and the esters of these dithiocarboxylic acids are also useful electron acceptor monomers.

The Friedel-Crafts catalysts useful in carrying out the copolymerization process of this invention are inert to water under the conditions of polymerization. Oxidizing salts or halides of metals which are at least divalent are preferred. Such catalysts include halides of zinc, nickel, magnesium, cerium, tin, zirconium, chromium, vanadium, titanium and molybdenum. Oxyhalides or hydrates of such Friedel-Crafts catalysts are effective catalysts. Typical metal compounds thus include zinc chloride, magnesium chloride, nickel chloride, ceric ammonium nitrate and the like. Although amounts of the Friedel-Crafts catalysts may vary over a wide range, the concentration is generally between 0.01–5 moles per mole of electron acceptor monomer, preferably 0.05–1 moles per mole.

The molar ratio of the electron donor monomer to the electron acceptor monomer will generally range from 5:95 to 95:5. The equimolar alternating copolymers are produced independent of comonomer ratio. For ease of handling the reaction mixture and to increase the reaction rate an excess of one of the monomers is sometimes preferred.

The solubility or emulsifiability of one or more of the monomers in water appears to play little or no role in the copolymerization reaction of the present invention. The copolymerization proceeds both in the absence and in the presence of an emulsifier. The polymerizing species which is believed to be a complex containing both monomers and the complexing agent is generally insoluble in the aqueous medium. The alternating copolymer is also insoluble and therefore the reaction occurs predominantly in a heterogeneous environment.

Although water is an inert ingredient in the present invention, the reaction is generally carried out with as little water as is practical for ease of handling. In general, the amount of water will range from ten times to one tenth the volume of the monomers. The preferred amount of water is from three times to one third the volume of monomers.

The prior art teaches that the copolymerization of donor and acceptor monomers in the presence of a Friedel-Crafts catalyst or organoaluminum halide is catalyzed by an organic peroxide or other organic free radical precursor. The use of an aqueous medium in the process disclosed herein does not in itself preclude the use of organic or monomer soluble catalysts as demonstrated by the effectiveness of such initiators in suspension and emulsion polymerization processes. Nevertheless, monomer soluble catalysts such as benzoyl peroxide, tertiary butyl peroxypivalate and azobisisobutyronitrile are ineffective in the process of the present invention in that they yield random copolymers in contrast to the equimolar, alternating copolymers produced in the presence of a water-soluble catalyst.

The water-soluble free radical initiators which are effective in the process of the present invention include water-soluble peroxygen compounds such as perborates, percarbonates, persulfates, perchlorates, peracids, peroxides, and the like. Such initiators include ammonium and potassium persulfate, peracetic acid and hydrogen peroxide.

The water-soluble free radical initiators are generally effective in the present invention at temperatures below those at which they are effective in emulsion or aqueous solution polymerization. Thus, whereas ammonium persulfate is generally used in emulsion polymerization at temperatures of 50°C. and above, it is effective at 30°C. in the process of the present invention. The concentration of free radical initiators generally ranges 0.001 to 10 weight percent based on monomer concentrations.

The use of redox systems permits the reaction to be carried out effectively either at lower temperatures or with lower initiator concentrations. Such redox systems include potassium persulfate-sodium bisulfite, ammonium persulfatesodium thiosulfate, ammonium persulfate-ferrous ammonium sulfate and potassium permanganate-oxalic acid. Other redox systems such as are conventionally used in emulsion and aqueous solution polymerization are generally effective in the present invention.

The temperature of polymerization may be as low as 0°C. or as high as 100°C. However, the preferred temperature range is from 5° to 70°C. The lower the ratio of electron acceptor monomer to Friedel-Crafts catalyst the lower the preferred temperature. The temperature of polymerization is selected as a result of consideration of the temperature at which the free radical precursor generates free radicals at a sufficient rate to promote rapid polymerization. A further consideration is the temperature at which the Friedel-Crafts catalyst undergoes hydrolysis in the aqueous medium and is converted to an ineffective complexing agent.

The process of the instant invention may be carried out on a continuous basis or as a batch process by the usual techniques known to one skilled in the art. In one embodiment of the process, the Friedel-Crafts catalyst and water are charged to the reactor, followed by the comonomers and the water-soluble free radical precursor or the components of the redox catalyst system. The reaction is then carried out for the desired period of time at the preferred temperature. The reaction is then terminated by the addition of methanol which deactivates the Friedel-Crafts catalyst. Where the reaction is conducted with an excess of one of the monomers which acts as a solvent for the alternating copolymer, the methanol also precipitates the copolymer from the reaction mixture. Treatment of the precipitated copolymer with ammoniacal methanol results in the removal of the inorganic residues from the Friedel-Crafts catalyst, and yields a copolymer with little or no ash content. The copolymer may be further purified by solution in a suitable solvent such as acetone and reprecipitation with methanol.

In another embodiment of the process, the Friedel-Crafts catalyst is added in several portions throughout the reaction period. This is particularly useful where high conversions are desired in a batch process since the insolubility of the copolymer in the aqueous medium results in entrappment of the Friedel-Crafts catalyst in the precipitated copolymer mass and reduces its availability to the unreacted comonomers.

In a further embodiment of the process, the water-soluble free radical precursor or the redox catalyst is added in several portions throughout the reaction period. This permits better control of the temperature in the exothermic reaction.

By the use of one of these embodiments of the instant process and by other variations which are obvious to one skilled in the art, it is possible to obtain equimolar, alternating copolymers in essentially quantitative yield based upon in equimolar comonomer charge. When one of the comonomers is charged in excess of an equimolar amount, the excess does not participate in the formation of the equimolar, alternating copolymer which may be obtained in essentially quantitative yield based on equimolar amounts of the comonomers.

The equimolar composition and alternating structure of the copolymers produced by the process of the instant invention may be confirmed by elemental analyses and/or nuclear magnetic resonance (NMR) spectroscopy.

The acrylonitrile and other nitrogen-containing monomer content of the copolymers may be determined from the nitrogen analysis. Since elemental analyses are considered acceptable when the observed analysis is within 0.5 percent absolute of the theoretical analysis, conversion of the nitrogen analysis to monomer content results in the latter ranging within ±3 percent of the true value. Thus, an acrylonitrile content of 47–53 percent is considered indicative of an equimolar copolymer. Since the random copolymer prepared from an equimolar mixture of styrene and acrylonitrile in the presence of a free radical catalyst contains 40 percent acrylonitrile, there is no difficulty in distinguishing the equimolar, alternating copolymer of the instant process from the random copolymer.

The unequivocal determination of polymer structure is based on the NMR analysis. The absence of donor monomer-doner monomer and acceptor monomer-acceptor monomer diads in the NMR spectrum confirms the alternating structure and hence the equimolar composition of the copolymers of the instant process. The absence of styrene-styrene and acrylonitrile-acrylonitrile diads in the NMR spectra of the styrene-acrylonitrile copolymers prepared by the process of the instant invention confirms the assignment of alternating structure and equimolar composition to the copolymers whose nitrogen analyses indicate the presence of 47–53 percent acrylonitrile.

The content of oxygen-containing monomer such as acrylic or methacrylic acid or ester in the copolymers may be determined from the carbon, hydrogen and/or oxygen analysis. However, in the case of styrene-methyl methacrylate copolymers prepared with an equimolar comonomer charge, elemental analyses serve to indicate the equimolar composition but are insufficient to confirm the alternating structure since an equimolar, random copolymer would be formed from a radical polymerization in the absence of the Friedel-Crafts catalyst. In this case, the absence of styrene-styrene and methyl methacrylate-methyl methacrylate diads in the NMR spectrum confirms the alternating structure.

The following examples are representative of the methods which are useful in the practice of this invention and should not be considered in any matter as limiting the scope thereof.

POLY(STYRENE-ALT-ACRYLONITRILE)

EXAMPLE 1

A 3-necked, 500 ml. flask equipped with stirrer, thermometer and nitrogen inlet and outlet was charged with 29.6 ml. of water and 12.8 g. of zinc chloride. A mixture of 19.6 g. of styrene and 10.0 g. of acrylonitrile was then added, followed by 2.7 g. of potassium persulfate. The styrene/acrylonitrile molar ratio was 1/1 and the acrylonitrile/zinc chloride molar ratio was 2/1. The temperature was elevated to 40°C. and maintained at 40°C. for 5 hours. The reaction was terminated by pouring the reaction mixture into methanol. The precipitated copolymer was filtered and stirred with ammoniacal methanol. This process was repeated three times with concentrated aqueous ammonia and the precipitate was finally filtered and washed with methanol. The product was dissolved in acetone and reprecipitated with methanol. The recovered copolymer was dried at 40°C. in vacuo. The yield of copolymer was 3.62 g., representing a monomer conversion of 12.2 percent. Elemental analysis indicated a nitrogen content of 9.05 percent corresponding to 50.8 mole-percent acrylonitrile. The product was therefore an equimolar styrene-acrylonitrile copolymer. A conventional free radical copolymerization would be expected to yield a 60/40 styrene-acrylonitrile copolymer from an equimolar charge. The NMR spectrum recorded in CDCl$_3$ at 70°C. indicated the absence of styrene-styrene and acrylonitrile-acrylonitrile diads, confirming the alternating structure of the equimolar copolymer. The intrinsic viscosity of the copolymer was 1.65 dl./g. in dimethylformamide at 30°C.

EXAMPLE 2

When a similar reaction as described in Example 1 was carried out at 50°C. for 1 hour the yield of copolymer was 1.2 g., representing a monomer conversion of 4.1 percent. The product contained 48.6 mole-percent acrylonitrile and its alternating structure was confirmed by NMR analysis. The equimolar copolymer had an intrinsic viscosity of 1.085 dl./g. in DMF at 30°C.

EXAMPLE 3

When a similar reaction as described in Example 1 was carried out at 30°C. for 30 minutes using 0.55 g. of potassium persulfate and 0.11 g. of sodium meta bisulfite as initiating system, the equimolar alternating copolymer (nitrogen and NMR analyses) was obtained in a yield of 11.9 g., representing a monomer conversion of 40.0 percent. The intrinsic viscosity in DMF at 30°C. was 2.27 dl./g.

EXAMPLE 4

A 500 ml. flask was charged with 28.3 g. of water and 12.24 g. of zinc chloride. The mixture was stirred until the zinc chloride dissolved and then 9.54 g. of acrylonitrile and 43.7 g. of styrene were introduced. The styrene/acrylonitrile molar ratio was 7/3 and the acrylonitrile/zinc chloride molar ratio was 2/1. A mixture of 0.81 g. of potassium persulfate and 0.18 g. of sodium bisulfite was introduced and the reaction was carried out at 30°C. for 20 hours. The reaction was terminated by the addition of methanol containing hydroquinone. The product was filtered, stirred with ammoniacal methanol and again filtered. After solution in acetone and precipitation into a large excess of methanol, the recovered copolymer was dried in vacuo at 40°C. for 16 hours. The yield of copolymer was 23.35 g., representing a monomer conversion of 82.6 percent when calculated on the basis of an equimolar styrene/acrylonitrile composition. Elemental analyses indicated the product contained 83.64 percent carbon, 7.07 percent hydrogen and 9.24 percent nitrogen which corresponds to a 48.5/51.5 styrene/acrylonitrile composition. A free radical copolymer obtained from the same comonomer charge would have had a 65.5/34.5 styrene/acrylonitrile composition. The equimolar composition and alternating structure of the copolymer was confirmed by NMR analysis.

When a similar reaction was carried out at 30°C. for 30 hours, the yield of equimolar, alternating copolymer was quantitative, based upon an equimolar styrene/acrylonitrile composition.

EXAMPLE 5

A 3-necked 300 ml. flask was charged with 15.7 ml. of water and 2.3 g. zinc chloride. A mixture of 5.3 g. of acrylonitrile and 10.4 g. of styrene was added, followed by 0.27 g. of potassium persulfate and 0.05 g. of sodium bisulfite. The styrene/acrylonitrile mole ratio was 1/1. The reaction mixture was stirred under nitrogen at 25°C. for 4 hours. After the addition of 2.3 g. of zinc chloride stirring was continued at 25°C. for another 4 hours. An additional 2.2 g. of zinc chloride was then added and stirring continued at 25°C. for 16 hours making a total reaction time of 24 hours. The acrylonitrile/zinc chloride mole ratio was 2/1. The reaction product was isolated by precipitation with methanol. After solution in acetone and precipitation with methanol, the product was dried in vacuo. The yield of copolymer was 12.9 g. representing a monomer conversion of 82.1 percent. Carbon, hydrogen and nitrogen analyses indicated that the copolymer had a 50/50 styrene/acrylonitrile composition. NMR analysis confirmed the alternating structure of the copolymer.

EXAMPLE 6

A mixture of 25.0 g. of styrene and 8.5 g. of acrylonitrile was added to a solution of 10.9 g. of zinc chloride in 25.1 ml. of water. The styrene/acrylonitrile mole ratio was 6/4 and the acrylonitrile/zinc chloride mole ratio was 2/1. After the addition of 0.55 g. of potassium persulfate and 0.11 g. of sodium metabisulfite, the reaction mixture was stirred under nitrogen at 30°C. for 2 hours. The reaction was terminated by the addition of methanol. The precipitated copolymer was filtered, dissolved in acetone and reprecipitated with methanol. The dried copolymer weighed 14.0 g., representing a monomer conversion of 56.0 percent. Elemental analyses indicated that the copolymer had a 51/49 styrene/acrylonitrile composition while the absence of styrene/styrene and acrylonitrile-acrylonitrile diads in the NMR spectrum confirmed the alternating structure of the equimolar copolymer.

EXAMPLE 7

A 3-necked 300 ml. flask was charged with 31.4 ml. of water and 20.3 g. of magnesium chloride hexahydrate. A mixture of 20.8 g. of styrene and 10.6 g. of acrylonitrile was added, followed by 2.28 g. of ammonium persulfate. The styrene/acrylonitrile mole ratio was 1/1 and the acrylonitrile/magnesium chloride mole ratio was 2/1. The reaction mixture was stirred under nitrogen at 40°C. for 3 hours. The reaction product was isolated by precipitation with methanol, washed with ammonia several times, and, after a final wash with methanol, dried in vacuo. The yield of copolymer was 1.32 g. representing a monomer conversion of 4.2 percent. The nitrogen content was 9.10 percent indicating an acrylonitrile content of 51.1 percent. The alternating structure of the equimolar copolymer was confirmed by NMR analyses.

EXAMPLE 8

The reaction described in Example 7 was carried out in the presence of 23.7 g. of nickel chloride hexahydrate. The yield of copolymer was 1.10 g. The nitrogen content of 8.64 percent indicated a styrene/acrylonitrile mole ratio of 51.4/48.6 and NMR analysis confirmed the formation of an equimolar, alternating copolymer.

POLY(STYRENE-ALT-METHYL METHACRYLATE)

EXAMPLE 9

An aqueous zinc chloride solution was prepared by dissolving 13.6 g. of zinc chloride in 41.0 ml. of water. A mixture of 20.0 g. of methyl methacrylate and 20.8 g. of styrene was added, followed by 0.55 g. of potassium persulfate and 0.11 g. of sodium metabisulfite. The styrene/methyl methacrylate mole ratio was 1/1 and the methyl methacrylate/zinc chloride mole ratio was 2/1. The reaction was carried out under nitrogen with stirring for 4 hours at 30°C. The product was precipitated with methanol, filtered, dissolved in benzene and reprecipitated with methanol. The yield of copolymer was 3.8 g. representing a monomer conversion of 9.3 percent. Elemental analyses indicated that the product was an equimolar copolymer while the absence of styrene-styrene and methyl methacrylate-methyl methacrylate diads in the NMR spectrum confirmed the alternating structure of the copolymer.

EXAMPLE 10

The copolymerization of 10.4 g. of styrene and 10.0 g. of methyl methacrylate (styrene/methyl methacrylate mole ratio 1/1) in the presence of 20.4 ml. of water and 13.6 g. of zinc chloride (methyl methacrylate/zinc chloride mole ratio 1/1) was carried out at 25°C. using 0.27 g. of potassium persulfate and 0.05 g. of sodium bisulfite as redox catalyst. After 23 hours, the reaction was terminated by precipitation with methanol. The yield of copolymer was 4.2 g. representing a monomer conversion of 20.6 percent. Oxygen analysis and the NMR spectrum confirmed the equimolar composition and the alternating structure of the copolymer, respectively.

POLY(STYRENE-ALT-BUTYL ACRYLATE)

EXAMPLE 11

A mixture of 12.8 g. of butyl acrylate and 10.4 g. of styrene was added to a flask which had previously been charged with 23.2 g. of water and 13.6 g. of zinc chloride. The styrene/butyl acrylate mole ratio was 1/1 and the butyl acrylate/zinc chloride mole ratio was 1/1. The redox catalyst consisting of 0.27 g. of potassium persulfate and 0.05 g. of sodium bisulfite was added and the reaction mixture was stirred at 25°C. for 3 hours. The yield of copolymer, obtained by precipitation with methanol, solution in benzene and reprecipitation in methanol, was 1.13 g. representing a conversion of 4.9 percent. Elemental analyses of the copolymer gave values of 78.34 percent carbon, 8.31 percent hydrogen and 13.29 percent oxygen which corresponds to a 48/52 styrene/butyl acrylate composition.

When the reaction was carried out at 25°C. for 20 hours the yield of copolymer was increased to 1.82 g. representing a conversion of 7.9 percent. The elemental analyses of 77.64 percent carbon, 8.24 percent hydrogen and 14.21 oxygen indicated a 49/51 styrene/butyl acrylate composition.

NMR analyses of the copolymers obtained after 3 hours and after 20 hours confirmed the alternating structure of both copolymers.

POLY(ISOPRENE-ALT-ACRYLONITRILE)

EXAMPLE 12

A 250 ml. flask was charged with 26 ml. of water and 60 g. of zinc chloride. After the aqueous solution was heated to 40°C., a mixture of 30 g. of isoprene and 10 g. of acrylonitrile was added, followed by 0.15 g. of potassium persulfate. The isoprene/acrylonitrile mole ratio was 70/30 and the acrylonitrile/zinc chloride mole ratio was 0.43. The reaction mixture was maintained at 40°C. for 1 hour. The copolymer was isolated by precipitation with methanol and after washing with ammonia and methanol was obtained in a yield of 2.0 g. This represented a yield of 11.0 percent when calculated on the basis of a 1:1 isoprene/acrylonitrile composition. Nitrogen analysis indicated an acrylonitrile content of 51.3 mole-percent, confirming the equimolar composition of the copolymer. The alternating structure was confirmed by NMR analysis.

EXAMPLE 13

When a similar reaction as described in Example 12 was carried out at 40°C. for 3 hours the yield of copolymer was 2.8 g. representing a 12.2 percent yield on the basis of a 1:1 isoprene/acrylonitrile composition. The nitrogen analysis indicated a 47.8/52.2 isoprene/acrylonitrile molar composition. NMR analysis demonstrated the alternating structure of the equimolar composition by the absence of isoprene-isoprene and acrylonitrile-acrylonitrile diads.

EXAMPLE 14

A mixture of 4.6 g. of isoprene and 31.8 g. of acrylonitrile was added to a solution of 60 g. of zinc chloride in 26 ml. of water at 50°C. The isoprene/acrylonitrile mole ratio was 10/90 and the acrylonitrile/zinc chloride mole ratio was 1.35. After the addition of 0.15 g. of potassium persulfate the reaction mixture was maintained at 50°C. for 2 hours. The copolymer yield of 1.2 g. represented a 16.8 percent yield on the basis of an equimolar composition. The alternating structure and equimolar composition were confirmed by elemental and NMR analyses.

POLY(BUTADIENE-ALT-ACRYLONITRILE)

EXAMPLE 15

The reaction of 5.4 g. of butadiene and 26.5 g. of acrylonitrile in the presence of 6.8 g. of zinc chloride in 10.7 g. of water, using 0.27 g. of potassium persulfate and 0.05 g. of sodium bisulfite as redox catalyst system, was carried out in a bottle at 25°C. for 20 hours. The butadiene/acrylonitrile mole ratio was 1/5 and the acrylonitrile/zinc chloride mole ratio was 10/1. The rubbery precipitate obtained on the addition of methanol weighed 3.48 g. after drying, representing a monomer conversion of 32.5 percent based on an equimolar composition. The latter was confirmed by the 13.0 percent nitrogen content of the copolymer which indicated a 51/49 butadiene/acrylonitrile composition. The absence of butadiene-butadiene and acrylonitrile-acrylonitrile diads in the NMR spectrum also confirmed the equimolar, alternating nature of the copolymer.

POLY(BUTADIENE-ALT-BUTYL ACRYLATE)

EXAMPLE 16

A bottle was charged with 18.2 g. of water, 13.6 g. of zinc chloride, 64.0 g. of butyl acrylate and 5.4 g. of butadiene. The butadiene/butyl acrylate mole ratio was 1/5 and the butyl acrylate/zinc chloride mole ratio was 5/1. After the addition of 0.27 g. of potassium persulfate and 0.05 g. of sodium bisulfite, the bottle was shaken at 25°C. for 20 hours. The product isolated by precipitation with methanol, after drying, weighed 2.2 g. representing a 12.1 percent conversion based on an equimolar composition. The elemental analyses of the copolymer indicated 72.33 percent carbon, 10.01 percent hydrogen and 17.81 percent oxygen which corresponds to a 49/51 butandiene/butyl acrylate composition. The equimolar, alternating structure of the copolymer was confirmed by NMR analyses.

POLY(ISOBUTYLENE-ALT-BUTYL ACRYLATE)

EXAMPLE 17

A bottle was charged with 18.4 g. of water and 13.6 g. of zinc chloride. Following the addition of 12.8 g. of butyl acrylate, the bottle was purged with nitrogen and cooled to 0°C. After the addition of 0.54 g. of potassium persulfate and 0.10 g. of sodium bisulfite, 28.0 g. of isobutylene was condensed in the bottle which was then sealed. The isobutylene/butyl acrylate mole ratio was 5/1 and the butyl acrylate/zinc chloride mole ratio was 1/1. The bottle was shaken at 0°C. for 20 hours and the contents were then precipitated with methanol. The dried copolymer weighed 3.3 g. representing a 17.9 percent conversion based on an equimolar composition. Based on carbon, hydrogen and oxygen analyses the copolymer was demonstrated to have an equimolar isobutylene/butyl acrylate composition. The alternating structure of the copolymer was confirmed by NMR analyses.

The above examples demonstrate that the process of the instant invention can readily be employed to produce equimolar, alternating copolymers.

Numerous advantages result from the use of an aqueous medium for carrying out the copolymerization reaction. The most obvious advantage is the use of a reaction medium which is readily obtained free of inhibiting impurities and does not require the extensive purification and recovery required when an organic solvent is used. The preferred water-soluble initiators, including redox systems, can be readily stored and handled at ordinary temperatures and yet can be used at low temperatures. In contrast, the solvent or monomer-soluble initiators which can be used at low temperatures require special storage and handling. Further, since the copolymers produced by the instant process are substantially insoluble in water, product isolation is simplified by the elimination of the organic diluents employed in the prior art processes.

While particular embodiments of this invention are shown above, it will be understood that the invention is obviously subject to variations and modifications without departing from its broader aspects.

What is claimed is:

1. In a process for preparing equimolar alternating copolymers by copolymerization of a hydrocarbon electron donating monomer consisting of conjugated dienes with an electron accepting monomer selected from the group consisting of alkyl and aryl acrylates and methacrylates, acrylonitrile and methacrylonitrile, the improvement which comprises carrying out said copolymerization at a temperature within the range of about 0° to 100°C., in an aqueous medium containing 0.01 to 5 moles per mole of electron accepting monomer of a Friedel-Crafts halide which is at least divalent and stable to hydrolysis at the reaction temperature and 0.001 to 10 percent by weight based on the weight of the monomers of a water-soluble peroxygen compound free radical initiator.

2. In the process of claim 1 wherein said conjugated diene is selected from the group consisting of butadiene and isoprene.

3. In the process of claim 1 wherein said acrylic nitrile is acrylonitrile.

4. In the process of claim 1 wherein said methacrylic ester is methyl methacrylate.

5. In the process of claim 1 wherein said electron accepting monomer is butyl acrylate.

6. In the process of claim 1 wherein said Friedel-Crafts halide is selected from the group consisting of zinc chloride, magnesium chloride and nickel chloride.

7. In the process of claim 1 wherein said peroxygen compound is persulfate.

8. In the process of claim 1 wherein said free radical initiator is a redox system.

9. In the process of claim 8 wherein said redox system consists of a persulfate and a bisulfite.

* * * * *